Patented July 22, 1924.

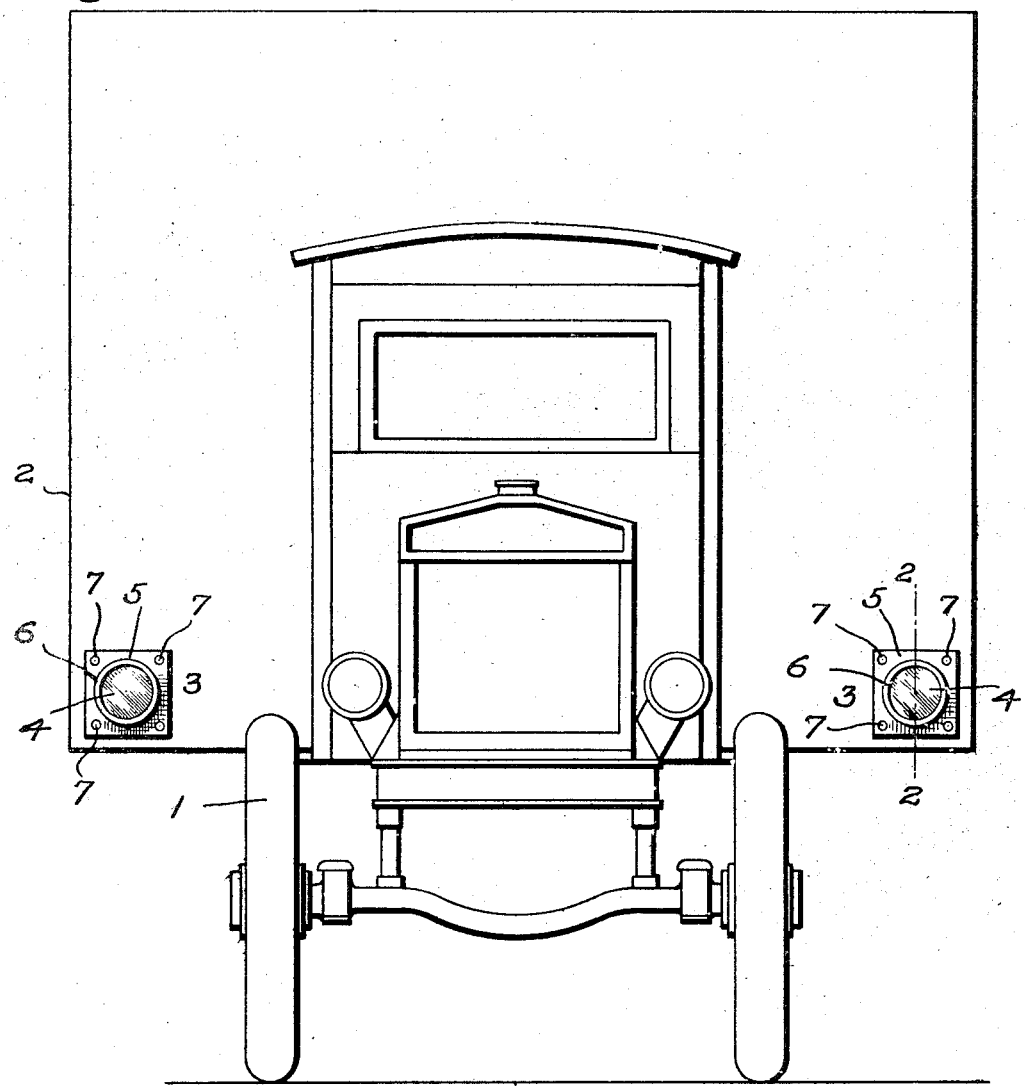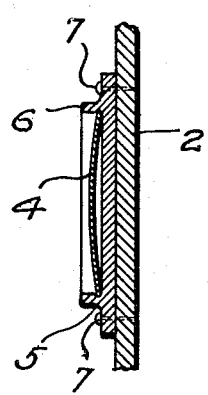

1,502,424

UNITED STATES PATENT OFFICE.

HENRY P. J. EARNSHAW, OF BERLIN, MASSACHUSETTS.

AUTOMOBILE LIGHTING SYSTEM.

Application filed December 13, 1920. Serial No. 430,110.

*To all whom it may concern:*

Be it known that I, HENRY P. J. EARNSHAW, a citizen of the United States, and resident of Berlin, county of Worcester, State of Massachusetts, have invented an Improvement in Automobile Lighting Systems, of which the following description, in connection with the accompanying drawing, is a specification, like characters on the drawing representing like parts.

One of the dangers incident to night driving with automobiles is that incurred in meeting trucks having wide bodies or wide loads thereon. The headlights of a motor truck are usually the same distance apart as the headlights of an ordinary automobile and therefore, if when a person who is driving after dark meets a truck, the headlights of the truck give no indication as to the width of the truck body. The driver of the automobile therefore has no means of knowing how far he should turn out in order to clear the motor truck and the result is that it not infrequently happens that the driver of an automobile miscalculates the width of the truck he is meeting and fails to turn out far enough to clear the truck, in which case the truck body will engage and injure the top of the automobile.

It is the object of my invention to provide a novel indicator which can be applied to any motor truck and which will give at night to an oncoming automobile a sure indication as to the width of the truck.

I accomplished this end by placing on the front of the truck body closely adjacent to each outer edge a forwardly-facing reflector which is situated so that it will reflect toward an oncoming automobile the headlights of said automobile. With this arrangement, whenever an automobile meets a truck the reflector will cause a reflection of the headlights of the automobile and since the reflectors are situated at the outer extremities of the truck body such reflection will give at once an indication as to the width of the body and will enable the automobile meeting a truck to turn out sufficiently to clear the truck, thus avoiding accidents.

In order to give an understanding of my invention I have illustrated in the drawings a selected embodiment thereof which will now be described and after which the novel features will be pointed out in the appended claim.

Fig. 1 of the drawings is a front view of a motor truck having my improvements supplied thereto.

Fig. 2 is an enlarged section on the line 2—2 Fig. 1.

1 indicates a motor truck having a body or load 2 which is considerably wider than the wheels of the truck and which therefore projects laterally beyond the wheel base for a considerable distance on each side.

In accordance with my invention I apply to the front of the body 2 or load and adjacent the outer edge thereof on each side a reflector 3. These reflectors 3 may have any suitable construction and are arranged so that they will reflect forwardly from the automobile the image of any object situated directly in front of the automobile. A plain mirror or polished metal will answer the purpose so long as it will give a proper reflection of the headlights of an automobile approaching the truck. These reflectors 3 should be so placed that the headlights of an automobile which is approaching a truck will be reflected by the reflectors back to the driver of an automobile and by placing the reflectors at the extreme outer edge of the truck body or the load thereon such reflection will give to the driver of the oncoming automobile a correct indication as to the over-all width of the truck.

In Fig. 2 I have indicated a form of reflector comprising a convex mirror 4 which is supported in a suitable frame or casing 5 that is constructed to be readily attached to the front of the automobile. I use a convex mirror so that light striking the mirror at any angle will be reflected back to the approaching machine.

The casing 5 is herein shown as having a flange 6 extending therefrom which surrounds the mirror 4 and serves to hold it in place. This flange projects far enough beyond the mirror to form a protection therefor, thus preventing the mirror from injury. The casing 5 is provided with apertures through which nails or screws 7 may be inserted for detachably fastening the reflector to the body 2.

My invention is very simple and can be readily applied to any truck and when so applied it furnishes the means for giving any automobile, meeting a truck after dark, a correct indication as to the width of the truck, thus enabling said automobile to turn out far enough to clear the truck.

I claim:

The combination with a vehicle having a body considerably wider than the wheels, of reflector holders secured to the front of the vehicle closely adjacent the outer edge of said body or the load thereon, each holder having a reflector-receiving recess surrounded by a protecting wall or flange, and a convex reflector in each recess constructed so that the light from the headlights from an automobile coming at an angle to the vehicle carrying the reflectors will be reflected back towards the driver of the automobile, said flange projecting beyond the reflector and protecting the same from injury.

In testimony whereof, I have signed my name to this specification.

HENRY P. J. EARNSHAW.